(12) United States Patent
Nichols et al.

(10) Patent No.: US 7,546,532 B1
(45) Date of Patent: Jun. 9, 2009

(54) METHODS AND APPARATUS FOR EDITING CONTENT

(75) Inventors: Jonathan L. Nichols, San Francisco, CA (US); Matthew E. Davey, Groton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 329 days.

(21) Appl. No.: 11/357,235

(22) Filed: Feb. 17, 2006

(51) Int. Cl.
*G06F 3/00* (2006.01)

(52) U.S. Cl. ............... 715/716; 715/723; 715/724; 715/725; 715/726; 715/731; 715/833; 715/976; 725/37

(58) Field of Classification Search ............... 715/716, 715/723–726, 731, 833, 976, 37
See application file for complete search history.

(56) References Cited

U.S. PATENT DOCUMENTS

| | | | | |
|---|---|---|---|---|
| 5,675,752 A * | 10/1997 | Scott et al. | ............... | 715/866 |
| 5,812,216 A * | 9/1998 | Peters et al. | ............... | 348/593 |
| 5,844,572 A * | 12/1998 | Schott | ............... | 345/440 |
| 5,999,173 A * | 12/1999 | Ubillos | ............... | 715/724 |
| 6,369,835 B1 * | 4/2002 | Lin | ............... | 715/726 |
| 6,414,686 B1 * | 7/2002 | Protheroe et al. | ............... | 345/474 |
| 6,532,043 B1 * | 3/2003 | Kurtze et al. | ............... | 348/584 |
| 6,628,303 B1 * | 9/2003 | Foreman et al. | ............... | 715/723 |
| 7,030,872 B2 * | 4/2006 | Tazaki | ............... | 345/418 |
| 7,062,713 B2 * | 6/2006 | Schriever et al. | ............... | 715/723 |
| 2003/0169373 A1 * | 9/2003 | Peters et al. | ............... | 348/593 |
| 2003/0206596 A1 * | 11/2003 | Carver et al. | ............... | 375/240.26 |
| 2004/0100482 A1 * | 5/2004 | Cajolet et al. | ............... | 345/716 |
| 2006/0132482 A1 * | 6/2006 | Oh | ............... | 345/419 |
| 2007/0089152 A1 * | 4/2007 | Patten et al. | ............... | 725/134 |

* cited by examiner

*Primary Examiner*—Kieu D Vu
*Assistant Examiner*—Patrick F Riegler
(74) *Attorney, Agent, or Firm*—Chapin IP Law, LLC; Barry W. Chapin, Esq.

(57) ABSTRACT

A respective user modifies (e.g., selects, drags, and drops) either one or both of a first visual representation of a first video clip segment and second visual representation of a second video clip segment to overlap with each other in order to create a so-called transition region while in an editing phase. In response to creating the overlap, a respective video editor application herein splices respective ends of the first visual representation and the second visual representation to indicate where respective first and second content overlap with each other. For example, to more clearly depict the spliced ends of content on a respective display screen, the video editor application initiates display of an overlapping content region to include a first region in which the first content appears to be overlaid on the second content and a second region in which the second content appears to be overlaid on the first content.

31 Claims, 9 Drawing Sheets

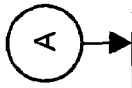

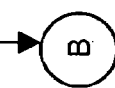

700-2

815 IN RESPONSE TO RECEIVING THE INPUT, INITIATE DISPLAY OF A TRANSITION REGION BETWEEN THE FIRST CONTENT REGION AND THE SECOND CONTENT REGION, THE TRANSITION REGION INCLUDING PORTIONS OF THE FIRST CONTENT REGION AND THE SECOND CONTENT REGION OVERLAID WITH RESPECT TO EACH OTHER TO REPRESENT A TRANSITION EFFECT TO BE APPLIED DURING PRESENTATION OF THE FIRST CONTENT FOLLOWED BY THE SECOND CONTENT

820 I) UTILIZE A FIRST REGION OF THE TRANSITION REGION TO DISPLAY A PORTION OF THE FIRST CONTENT REGION IN LIEU OF DISPLAYING A PORTION OF THE SECOND CONTENT REGION, AND II) UTILIZE A SECOND REGION OF THE TRANSITION REGION TO DISPLAY A PORTION OF THE SECOND CONTENT REGION IN LIEU OF DISPLAYING A PORTION OF THE FIRST CONTENT REGION

825 INITIATE DISPLAY OF A VISUAL AID TO INDICATE A SEPARATION BETWEEN THE PORTION OF THE FIRST CONTENT REGION AND THE PORTION OF THE SECOND CONTENT REGION DISPLAYED IN THE TRANSITION REGION

830 ENABLE SELECTIVE DISPLAY OF THE VISUAL AID TO INDICATE THE SEPARATION

835 DISPLAY A FIRST ELEMENT IN THE FIRST REGION FOR PURPOSES OF ENABLING AN EDIT OPERATION ASSOCIATED WITH THE FIRST CONTENT REGION AND TO INDICATE A TIME-BASED BOUNDARY OF THE FIRST CONTENT REGION

840 DISPLAY A SECOND ELEMENT IN THE SECOND REGION FOR PURPOSES OF ENABLING AN EDIT OPERATION ASSOCIATED WITH THE SECOND CONTENT REGION AND TO INDICATE A TIME-BASED BOUNDARY OF THE SECOND CONTENT REGION

FIG. 8

METHODS AND APPARATUS FOR EDITING CONTENT

BACKGROUND

Use of video editors and the like have become quite common in conventional computer applications. One reason for such a broad acceptance of video editors is the convenience afforded by their use. For example, via use of a window-based application such as a video editor, a computer user can open a "window" on a computer screen and modify the contents of a file such one or more video clips.

Typically, conventional video editors enable a respective user to select two video clips and create a transition region between them. The transition region indicates portions of the video clips that will include a respective transition effect on playback. An example of a transition that can be applied during a transition region is so-called fading between one video clip and another. On playback, images associated with the first video clip fade out while, at the same time, images associated with the second video clip appear on a respective display screen.

One way to illustrate a conventional transition region is to place a first video clip in a first editing track and another video clip in a separate, parallel editing track. The region where the two video clips overlap in time with respect to a timeline corresponds to a respective region in which a special transition effect will be applied during playback.

Another way to illustrate a conventional transition region is to abut ends of two video clips together on the same editing track. For example, other conventional video applications enable a user to join the end of a first video clip with the beginning of a second video clip to create a transition. A transition symbol is laid over a respective cut point where the two video clips meet each other.

SUMMARY

Conventional video editors suffer from a number of deficiencies. For example, as discussed above, conventional video editors enable a user to create transitions between video clips on a single track. However, the visual representation of a respective transition according to conventional techniques can be misleading and cumbersome to use. For example, a transition symbol overlaid on two abutting video clips on a respective timeline can occlude a respective tail selector of the first video clip and a respective head selector of the second video clip. This can render it difficult to view attributes (e.g., selectable endpoints) associated with the content underlying or in the same area the transition symbol. Additionally, use of abutting video clips means that many selectable items (e.g., the transition symbol, the selectable head and tail ends of the video clips, etc.) must be packed into a small display region. This concentration of selectable items in a small area can render it difficult for the user to select and apply edit operations such as video clip trim operations to the video content in the transition region. Thus, to modify a transition region, a respective user may have to temporarily remove an overlaid transition symbol, apply a trim operation to ends of the clips or cut-point between the clips, and reapply a respective transition symbol over the cut-point to again create a transition between the video clips. Applying these extra commands or steps to modify a video clip transition can be quite time-consuming.

Techniques discussed herein deviate with respect to conventional applications such as those discussed above as well as additional techniques also known in the prior art. That is, certain specific embodiments herein are directed to creating transitions with respect to video clips on a single editing track. For example, in one specific embodiment, a video editor application presents segments of time-based content (e.g., video information such as video clip segments) on a respective display screen for modification by a user. A position of the time-based content with respect to a timeline indicates when the respective time-based content (e.g., video clips, audio clips, and potentially other types of contents as will be further discussed below) will be played back by a media player.

To create a transition while in an editing phase, a respective user slides (e.g., selects, drags, and drops) first content (e.g., a visual representation of a first video clip segment) and second content (e.g., a visual representation of a second video clip segment) to overlap with each other. In response to such an input, the video editor application herein splices respective ends of the first and second content to indicate where the content overlaps each other. In one embodiment, the video editor application initiates display of the spliced ends of the overlapping content to include a first region in which the first content appears to be overlaid on the second content and a second region in which the second content appears to be overlaid on the first content.

In addition to splicing as discussed above, the video editor application herein can initiate display of an overlapping region (showing splices of first content and second content) to include a visual aid (e.g., a separator) for purposes of illustrating a separation of respective spliced ends associated with the first and second overlapping content. Also, the video editor application herein can initiate display of the respective spliced ends of the first content and the second content to include selectable head selectors and/or tail selectors so that a respective user can easily perform trim operations with respect to the time-based content in the overlapping "transition" region.

In view of the specific embodiment discussed above, more general embodiments herein therefore include techniques associated with transitioning content. For example, in an example embodiment, an editor application displays a first content region and a second content region on a respective editing track on a display screen. The first content region represents a first time-based content segment (e.g., a first video clip segment). The second content region represents a second time-based content segment (e.g., a second video clip segment). The editor application initiates display of a transition region between the first content region and the second content region such that the transition region includes portions of the first content region and the second content region overlaid with respect to each other as discussed above. The transition region represents a transition effect to be applied during presentation of the first content followed by the second content.

In one embodiment, the editor application i) utilizes a first region of the transition region to display a portion of the first content region in lieu of displaying a portion of the second content region, and ii) utilizes a second region of the transition region to display a portion of the second content region in lieu of displaying a portion of the first content region. In other words, according to one embodiment, the editor application can initiate display of the transition region so it appears as though a portion of the first content region is overlaid on top of a portion of the second content region in the transition region and a portion of the second content region is overlaid on top of a portion of the first content region.

The editor application can receive input with respect to at least one of the first content region and the second content region. For example, the editor application can detect that a respective user drags and drops either one of the first content region or the second content region to overlap with each other on the same editing track. In response to receiving such input, the editor application initiates display of the first content region and the second content region to include an overlapping region in which at least part of the first content region and second content region are at least partially overlaid with respect to each other. For example, in response to receiving input, the editor application initiates display of the overlapping region to include i) a first region for displaying a portion of the first content region and ii) a second region for displaying a portion of the second content region.

In one embodiment, the editor application can splice respective ends of the first content region and the second content region to illustrate attributes associated with the overlapping region. For example, in response to receiving input such as a user overlapping the first content region and the second content region, the editor application herein initiates display of the first content region and the second content region to include an overlapping region in which at least part of the first content region and second content region are at least partially overlaid with respect to each other. In other words, the editor application herein renders one portion of the overlapping region so that it appears as though the first content region is at least partially overlaid on the second content region. The editor application renders another portion of the overlapping region so that it appears as though the second content region is at least partially overlaid on the first content region.

In further embodiments, the editor application can display further details associated with a respective transition between the first and second content. For example, in one embodiment, the editor application initiates display of a visual aid (e.g., a selectable display element, a separator, horizontally disposed bar, etc.) in the overlapping region or transition region to indicate a respective separation between the portion of the first content region and the portion of the second content region that overlap with each other. A respective user can control whether to display the visual aid based on respective commands to the editor application. Accordingly, the editor application enables selective display of the visual aid between the first content and the second in the overlapping region.

As discussed above, the editor application can automatically initiate splicing of respective ends associated with a respective transition between the first and second content upon detecting that the content has been moved to overlap with each other. Note that certain embodiments herein enable a respective user (or other entity) to specify the type of transition to be associated with the time-based content in the overlapping region when played back by a respective media player. For example, a respective user may specify that the transition will cause "fading" between the first content and the second during the transition on playback. Other types of transitions include scrolling, dissolving, page turning, etc.

In yet further embodiments, the editor application herein can initiate display of selection handles (e.g., selectable display elements or selection elements) associated with the first and second content both before and/or after creating a respective transition associated with the first and second content. For example, the editor application can display selection handles at one or more ends of the first content and second content. The selection handles can serve multiple purposes such as providing a visual indication of where a respective time-based content segment begins and ends as well as enabling editing operations (e.g., selecting, dragging, and/or dropping) with respect to the time-based content. Editing operations can include movement of a respective boundary of the content with respect to a timeline as well as movement of an entire segment with respect to a timeline.

In the context of an example embodiment herein, the editor application displays a selection handle (e.g., a selectable display element) in a first portion of the overlapping region to indicate a selectable time-based boundary associated with the first content region. In addition to marking an end of the first content in the overlapping region, the first selection handle also can be used to carry out editing operations (e.g., drag and drop trim operations) associated with the first content. The editor application also displays a second selection handle in a second portion of the overlapping region to indicate a selectable time-based boundary associated with the second content region. In addition to marking an end of the second content in the overlapping region, the second selection handle also can be used to carry out editing operations (e.g., drag and drop a trim operations) associated with the second content.

Additional embodiments herein include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment herein. This latter embodiment provides a way of creating, modifying, and displaying transitions associated with overlapping content.

Yet other embodiments herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for supporting operations such as creating, modifying, and displaying transitions associated with overlapping content. The instructions, when carried out by a processor of a respective computer device, cause the processor to perform the steps of: i) initiating display of a first content region and a second content region on an editing track; ii) initiating display of a transition region between the first content region and the second content region, the transition region including portions of the first content region and the second content region overlaid with respect to each other to represent a transition effect to be applied during presentation of the first content followed by the second content. Other embodiments of the present application include software programs to perform any of the method embodiment steps and operations summarized above and disclosed in detail below.

As discussed above, techniques herein are well suited for use in time-based editor applications such as those that support creating, modifying, displaying, and playback of transitions associated with overlapping video content. However, it should be noted that embodiments herein are not limited to use in such applications and that the techniques discussed herein are well suited for other applications as well.

It is to be understood that the system according to an embodiment herein can be embodied strictly as a software program, as software and hardware, or as hardware alone such as within a processor, or within an operating system or a within a software application. Example embodiments of the invention may be implemented within products and/or software applications such as those manufactured by Adobe Systems, Inc. of San Jose, Calif., USA. Additional features of the embodiments herein will be further discussed in the Detailed Description section of this application and accompanying figures. Note that the different embodiments herein can be executed independently or in combination with each other.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

FIGS. 7 through 9 illustrate a flowchart of more specific techniques supporting modification of content according to an embodiment herein.

DETAILED DESCRIPTION

According to an example embodiment, an editor application presents segments of time-based content (e.g., video information such as video clip segments) on a respective display screen for modification by a user. A position of the time-based content with respect to a timeline indicates when the respective time-based content (e.g., video clips) will be presented upon playback.

To create a transition while in an editing phase, a respective user slides (e.g., selects, drags, and drops) first content (e.g., a visual representation of a first video clip segment) and second content (e.g., a visual representation of a second video clip segment) to overlap with each other. In response to such an input, the video editor application herein splices respective ends of the first and second content to indicate where the content overlaps each other. In one embodiment, the video editor application initiates display of spliced ends of the overlapping content (e.g., a so-called transition region) to include a first region in which first content appears to be overlaid on second content and a second region in which the second content appears to be overlaid on the first content.

In addition to the technique of splicing as discussed above, the video editor application herein can initiate display of the transition region (showing the splices of first content and second content) to include a visual aid (e.g., a separator such as a line, box, etc.) for purposes of illustrating a separation of respective spliced ends associated with the first and second overlapping content. Also, the video editor application herein can initiate display of the respective spliced ends of the first content and the second content to include selectable head selectors and/or tail selectors (e.g., selectable elements) so that a respective user can easily perform trim operations with respect to the time-based content in the overlapping "transition" region. In certain embodiments, the head and tail selectors at end of respective content regions can be used to move respective content about an editing track in lieu of trimming respective ends.

Figure 1:
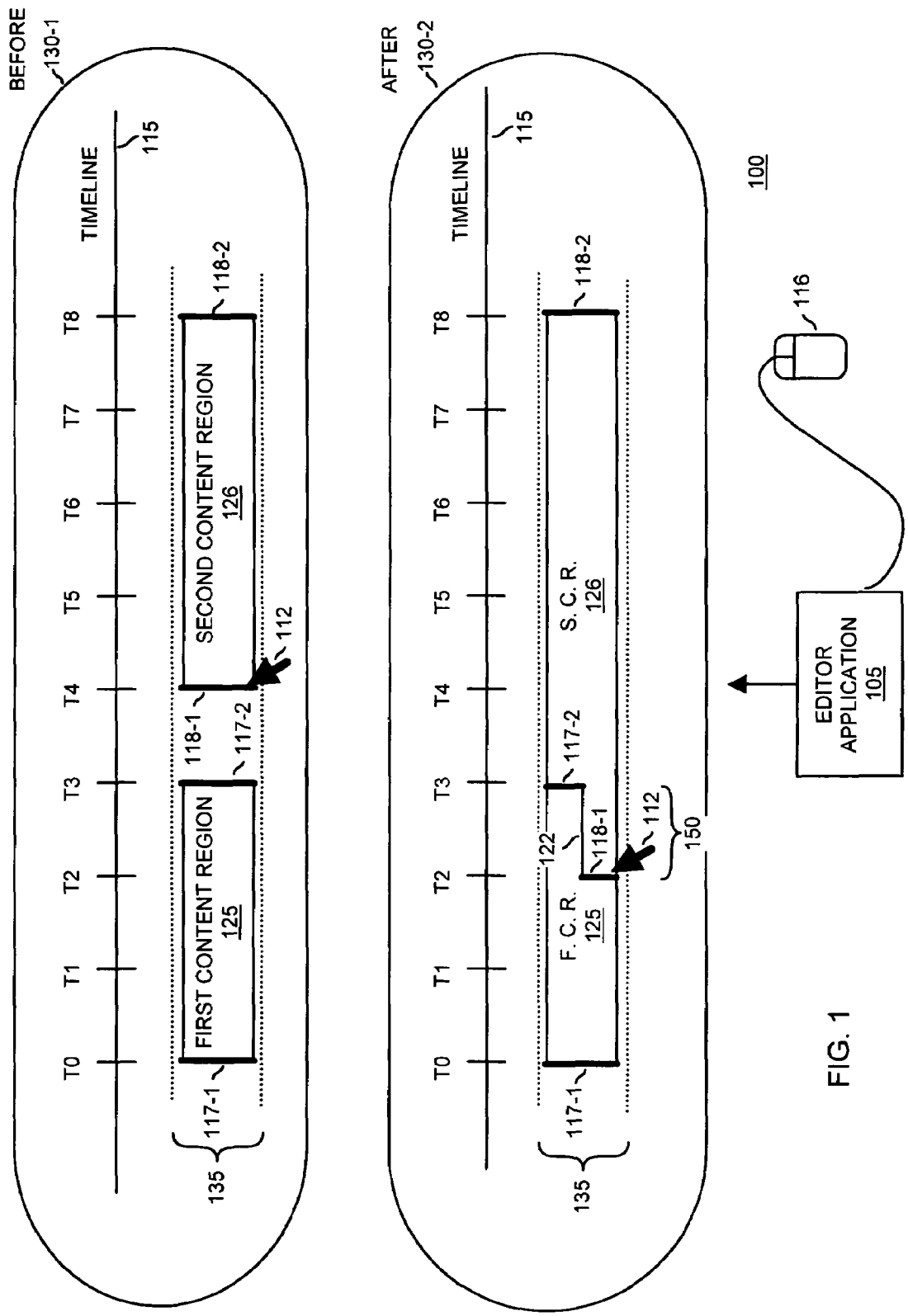
FIG. 1 is a diagram of a computer environment including an editor application according to an embodiment herein.

FIG. 1 is a diagram of a computer environment 100 supporting an editor application 105 according to an embodiment herein. As shown, computer environment 100 includes editor application 105 and corresponding display medium 130 (e.g., a computer monitor, display screen, flat panel display, etc.) to carry out functions as described herein. Editor application 105 produces editing track 135, timeline 115, first content region 125, and second content region 126 on display medium 130 to enable a respective user (or other entity) to provide input via tool 116 (e.g., a computer mouse) and create a transition region 150 with respect to corresponding content (e.g., content clips such as those represented by first content region 125 and second content region 126). Display medium 130-1 illustrates a display of graphical user interface 165-1 prior to creation of transition region 150. Display medium 130-2 illustrates a display of graphical user interface 165-1 after application of a respective command to create transition region 150.

In one embodiment, first content region 125 and second content region 126 represent durations of respective time-based content (e.g., video clips, slides, images, etc.) that can be played back on a respective media player. Time-based content can also include static images, pictures and the like that are played back over time.

The editor application 105 can initiate display of selection handles (e.g., selectable display elements such as element 117-1 and the like) associated with the first content region 125 and the second content region 126 both before and/or after creating a respective transition region 150 as in editing track 135. For example, the editor application can display element 117-1 and element 117-2 associated with first content region 125 for purposes of modifying the first content region 125. Editor application 105 displays element 118-1 and element 118-2 associated with second content region 126 for purposes of modifying the second content region 126.

Referring to display medium 130-2, the editor application 105 displays element 117-2 (e.g., a tail selector) in the transition region 150 to identify a respective ending of the first content region 125 with respect to timeline 115 of editing track 135. Editor application 105 displays element 117-1 (e.g., a head selector) associated with the first content region 125 at an opposite end of the first content region 125 as element 117-2 to identify a respective beginning of the first content region 125 with respect to the timeline 115. Further, editor application 105 displays element 118-1 (e.g., a head selector) in the transition region 150 to identify a respective beginning of the second content region 126 with respect to the timeline 115. Editor application 105 displays element 118-2 (e.g., a tail selector) associated with the second content region 126 at an opposite end of the second content region 126 as element 118-1 to identify a respective ending of the second content region 126 with respect to the timeline 115.

The "end" elements (e.g., head and/or tail ends) associated with the first content region 125 and the second content region 126 can serve multiple purposes such as providing a visual indication of where a respective time-based content segment begins and ends as well as enabling editing operations (e.g., selecting, dragging, and/or dropping) with respect to the time-based content. As will be further discussed, editing operations can include movement of a respective element with respect to timeline 115 as well as movement of an entire content segment with respect to timeline 115.

More specifically, via editor application 105, a user operates respective tool 116 to move pointer 112 (e.g., a cursor, pointer, etc.) about the display medium 130 and apply editing commands such as trim operations to change a respective length of time-based content appearing in editing track 135. That is, a respective user can utilize tool 116 to move pointer 112 over element 118-1 and thereafter select, drag and drop element 118-1 two time units to the left of original position time T4 on timeline 115. Prior to application of the drag and drop command as shown in display medium 130-1, element 118-1 falls at time T4 on timeline 115. Second content region 126 also has an associated length of four time units (e.g., seconds). After applying the edit command as shown in display medium 130-2, element 118-1 falls at time T2 on timeline 115 and the respective time-based clip associated with the second content region 126 is six units. This is an example of lengthening a duration of corresponding time-based content associated with the second content region 126. Note that a respective user can also shorten a respective time-based clip by selecting, dragging and dropping element 117-2 and/or element 118-2 to the left or by selecting, dragging and dropping element 117-1 and/or element 118-1 to the right.

Each of the first content region 125 and the second content region 126 can represent a corresponding portion of a master clip of time-based information stored in memory or on disk. As a respective user slides a head selector (i.e., element 117-1 or element 118-1) or tail selector (i.e., element 117-2 or element 118-2) associated with a respective content region (e.g., first content region 125 or second content region 126), the portion of the master content (as represented by the respective first or second content region) to be played during playback increases or decreases accordingly.

In one embodiment, if a respective user attempts to enlarge one of the first content region and/or the second content region beyond a respective threshold value (e.g., beyond a respective beginning or end of the underlying master content represented by the content region), the editor application 105 can generate an audible signal to the user that this is an illegal trim operation. Consequently, the user can be audibly warned during attempts to trim a respective video clip beyond ends of the master content. Note also that editor application 105 can visually indicate that a boundary of a respective content region has reached a limit by restricting further enlargement of a respective content region when reaching a threshold value with respect to the master content.

As an example, master content associated with the second content region 126 can be seven units in length. The second content region 126 in display medium 130-1 can represent a portion of the master content such as the last four a contiguous units of the master content. If the user attempted to move element 118-1 more than three units to the left, the editor application would generate an audible tone (e.g., sound) warning the user of an illegal operation as described above.

Referring again to the present example as shown, the editor application 105 initially displays first content region 125 and second content region 126 on a respective editing track as non-overlapping content without a transition region. As illustrated in display medium 130-2, after dragging and dropping element 118-1 two units to the left, the editor application initiates display of transition region 150 between the first content region 125 and the second content region 126 such that the transition region 150 appears to include portions of the first content region 125 and the second content region 126 overlaid with respect to each other. As discussed above, the transition region 150 represents a transition effect (e.g., scrolling, folding, etc.) to be applied during presentation of the first content followed by the second content. During playback, a "folding" transition can include wiping away a first video clip and gradually introduces a second respective video clip.

In further embodiments, the editor application 105 displays further details associated with a respective transition between the first content region 125 and the second content region 126 in display medium 130-2. For example, in one embodiment, the editor application 105 initiates display of a visual aid 122 (e.g., a selectable display element, a separator, horizontally disposed bar, a line, a box, etc.) in the transition region 150 to indicate a respective separation between a portion of the first content region 125 and a portion of the second content region 126 that overlap with each other in the transition region 150. A respective user can control whether to display the visual aid 122 based on respective commands to the editor application 122. Accordingly, the editor application 105 enables selective display of the visual aid 122 between the first content and the second in the transition region 150. In one embodiment, the visual aid 122 such as a selectable display element is displayed in a substantially horizontal manner to a user.

Note that editor application 105 also can enable a respective user to turn the elements 117 and 118 ON and OFF (e.g., make them appear and disappear) for purposes of reducing excess clutter on a display screen during an editing mode when such items are not needed by the user. Thus, embodiments herein include selectively displaying respective elements 117 and 118 associated with the first content region 125 and second content region 126 depending on a selected mode setting by a user.

In addition to enabling a respective user to turn the visual aid 122 ON and OFF, note that certain embodiments herein enable a respective user (or other entity) to specify the type of transition to be associated with the time-based content in the overlapping region when played back by a respective media player. For example, a respective user can specify that the transition will cause "fading" between the first content and the second content during the transition on playback. Other types of transitions include scrolling, dissolving, page turning, etc. In the context of the present example, a user can specify a type of transition effect to be associated with transition region 150 by moving pointer 112 in vicinity of visual aid 122, right clicking on tool 116, and selecting a type of transition effect presented in a corresponding pull-down menu.

The editor application 105 can automatically initiate splicing of respective ends associated with a respective transition between the first and second content upon detecting that the content has been moved or trimmed to overlap with each other. In one embodiment, the editor application 105 utilizes a first region (e.g., a region of the first content region 125 between T2 and T3 above visual aid 122) in the transition region 150 of display medium 130-2 to display a portion of the first content region 125 in lieu of displaying a portion of the second content region 126. The editor application 105 also utilizes a second region (e.g., a region of the second content region 126 between T2 and T3 above visual aid 122) of the transition region 150 to display a portion of the second content region 126 in lieu of displaying a portion of the first content region 125. In other words, according to one embodiment, the editor application 105 can initiate display of the transition region 150 so it appears as though a portion of the first content region 125 is overlaid on top of a portion of the second content region 126 in the transition region 150 and a portion of the second content region 126 is overlaid on top of a portion of the first content region 125.

As discussed above, the editor application 105 can receive input with respect to at least one of the first content region 125 and the second content region 126. For example, the editor application can detect that a respective user drags and drops either one of the first content region 125 or the second content region 126 to overlap with each other on the same editing track 135. In response to receiving such input, the editor application initiates display of the first content region 125 and the second content region 126 to include an overlapping region (e.g., transition region 150) in which at least part of the first content region and second content region are at least partially overlaid with respect to each other. For example, in response to receiving input, the editor application initiates display of the overlapping transition region 150 to include i) a first region for displaying a portion of the first content region 125 and ii) a second region for displaying a portion of the second content region 126.

Similar to the embodiments discussed above, the editor application 105 can visually splice respective ends of the first content region 125 and the second content region 126 to illustrate attributes associated with the transition region. For example, in response to receiving input such as a user initiating the first content region 125 and the second content region 126 to overlap with respect to each other, the editor application 105 herein initiates display of the first content region 125 and the second content region 126 to include an overlapping region in which at least part of the first content region 125 and second content region 126 are at least partially overlaid with respect to each other. More specifically, the editor application 105 herein renders one portion of the transition region 150 so that it appears as though the first content region 125 is at least partially overlaid on the second content region 126. The editor application 105 renders another portion of the overlapping region so that it appears as though the second content region 126 is at least partially overlaid on the first content region 125.

Transition region 150 can be further described in yet another way. For example, the editor application 105 can initiate display of the transition region 150 by splicing respective ends of the first content region 125 and the second content region 126 in the transition region 150 such that a portion of an end of the first content region 125 in the transition region 150 appears to be "cut out" for purposes of displaying a portion of the second content region 126 and an end of the second content region 126 in the transition region appears to be "cut out" for purposes of displaying a portion of the first content region 125.

As shown in editing track 135 of display medium 130-2, after receiving input from a respective user to overlap the first content region 125 and the second content region 126, the editor application 105 can display part but not all of element 117-2 in the transition region 150 to indicate where the first content region 125 ends with respect to timeline 115. Editor application also can display part but not all of element 118-1 in the second display region 126 to indicate where the second content region 126 begins with respect to the timeline 115. Accordingly, even though the segments overlap with each other, the boundaries elements are still displayed for further selection and editing.

Figure 2:
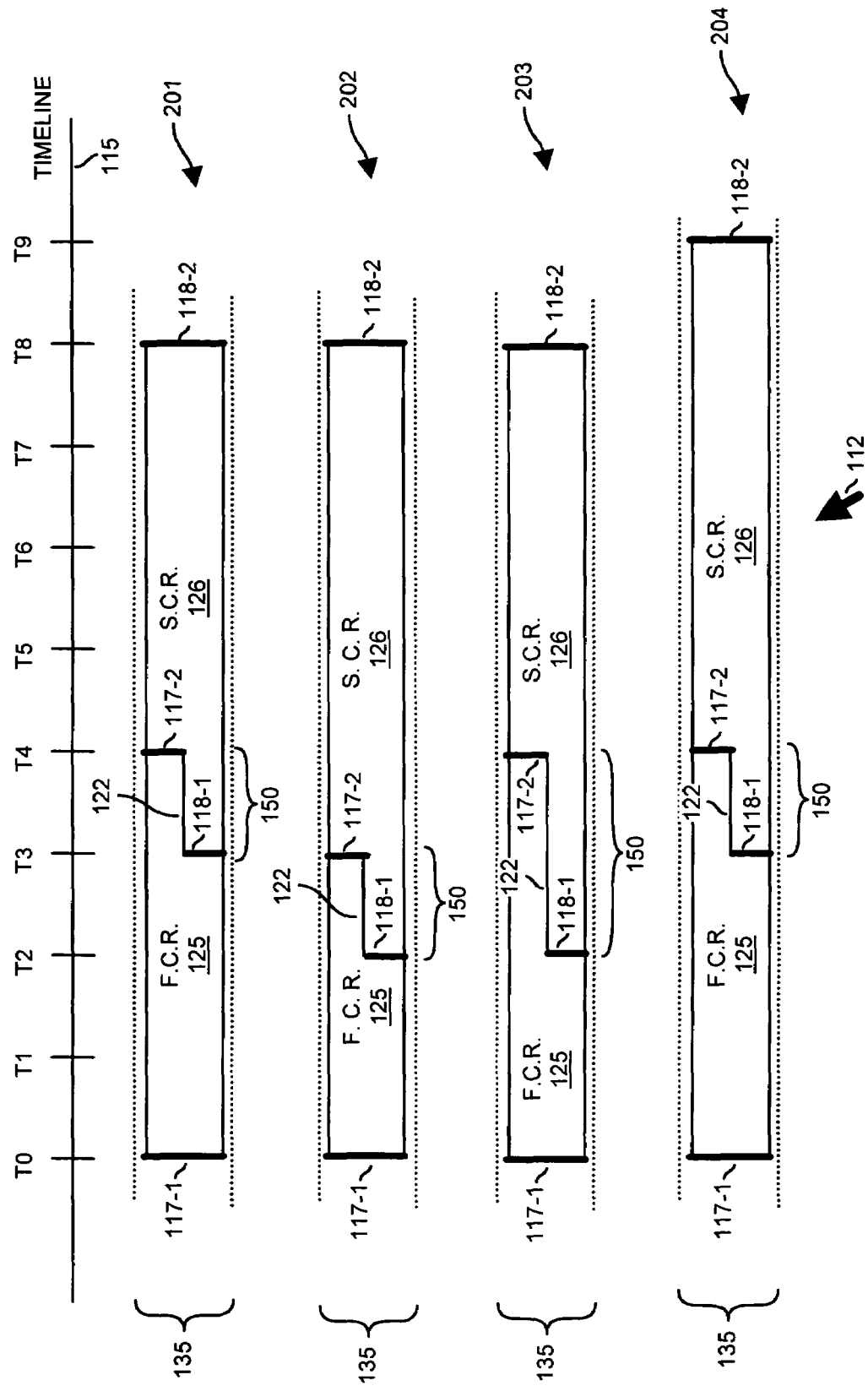
FIG. 2 is a diagram illustrating application of different types of modification commands to create a transition region according to embodiments herein.

FIG. 2 is a diagram illustrating application of different types of modification commands to create a transition region 150 according to embodiments herein. As will be discussed in further detail below, each successive display of editing track 135 beneath timeline 115 appears on a respective display medium 130 at different times depending on edits applied during the different steps. For example, a respective user applies a command to edit content in editing track 135 in screenshot 201 to produce the results shown in screenshot 202. Further, a respective user applies a command to edit content in editing track 135 in screenshot 202 to produce the results shown in screenshot 203, and so on. Thus, the different screenshots illustrate how editing track 135 and corresponding contents appear to a respective user over time in response to application of different editing commands.

Screenshot 201 illustrates a first content region 125 and second content region 126 including a respective transition region 150 in accordance with embodiments as previously discussed. The following example will illustrate how editor application 105 enables a respective user to slide transition region 150 in a respective editing track 135 while elements 117-1 and 118-2 remain fixed with respect to timeline 115.

For example, in screenshot 201, editor application 105 displays element 117-2 at an end of first content region 125 for purposes of enabling an edit operation associated with the first content region 125 and to indicate a respective time-based boundary of the first content region. Editor application 105 also displays element 118-1 at an end of second content region 126 for purposes of enabling an edit operation associated with the second content region 126 and to indicate a boundary of the second content region 126. Opposite respective elements 117-2 and 118-1, the editor application 105 displays respective elements 117-1 and 118-2 to indicate additional boundaries associated with the first content region 125 and the second content region 126.

During a drag and drop operation with respect to a pre-selected grouping of element 118-1 and/or element 117-2, editor application 105 initiates movement of the grouping such that the element 118-1 and 117-2 remain at a fixed length with respect to each other but move along the timeline 115 together. For example, a respective user can click on element 118-1 and element 117-2. Editor application 105 can provide an indication (e.g., highlighting, shading, coloring, etc.) that element 118-1 and element 117-2 have been pre-selected and therefore included in a grouping. In one embodiment, editor application 105 provides a visual indication to distinguish respective ends (e.g., end elements of first content region 125 and second content region 126) that are included in the grouping (e.g., set) as well as respective ends (e.g., elements) not included in the grouping.

The user can then initiate selection, dragging and dropping of either one of element 118-1 or 117-2 in the grouping to the left by one unit. In response to such an input, editor application 105 initiates display of screenshot 202 illustrating movement of a respective transition region 150 to the left by one time unit. Note that in one embodiment, a respective user can alternatively achieve the same end based on a respective input such as selecting, dragging, and dropping of the visual aid 122 to the left by one time unit. Accordingly, a respective user can slide a transition region 150 about a respective editing track 135 while endpoints as identified by element 117-1 and element 118-2 remain fixed with respect to timeline 115. Also, selection of different elements to in a grouping enables a respective user to move multiple elements so they remain fixed with respect to each other but move with respect to timeline 115 while other elements not in the grouping remain fixed with respect to the timeline 115.

For the next example, using screenshot 202 as a starting point, assume that a respective user applies further editing commands to modify a respective transition region 150. For example, assume that a user first cancels the grouping of element 117-2 and element 118-1 so that there is no longer a group selection. In such a mode, only the element selected, dragged, and dropped by the user will move with respect to timeline 115 while the others will stay fixed. For example, assume in screenshot 202 that a respective user selects, drags, and drops element 117-2 one unit to the right to align with time T4 of timeline 115. In response to such an input, editor application 105 initiates the display of editing track 135 and corresponding content to appear as shown in screenshot 203. That is, the transition region 150 has been extended from one unit (e.g., initially between time T2 and T3) to two units (e.g., between time T2 and T4) while element 117-1 remains at time T0 with respect to timeline 115 and element 118-2 remains at time T8 with respect to timeline 115.

For the next example, using screenshot 203 as a starting point, assume that a respective user applies further editing commands to modify a respective transition region 150 between time T2 and T4 of timeline 115. For example, assume in this example that a respective user utilizes pointer to click on element 118-1 and element 118-2 to form a grouping. As discussed above, the editor application 105 can use distinctive display attributes to indicate that only element 118-1 and 118-2 are part of the pre-selected grouping. Assume further in this example that the user utilizes pointer 112 to select, drag, and drop one of element 118-1 or element 118-2 to the right by one time unit. In response to such an input, editor application produces the depiction of first content region 125 and second content region 126 as shown in screenshot 204. For example, such input causes results in execution of two types of editing functions. First, the transition region 150 in editing track 135 is reduced by one time unit. Also, the durations associated with first content region 125 and second content region 126 remains the same before and after applying the input.

Figure 3:
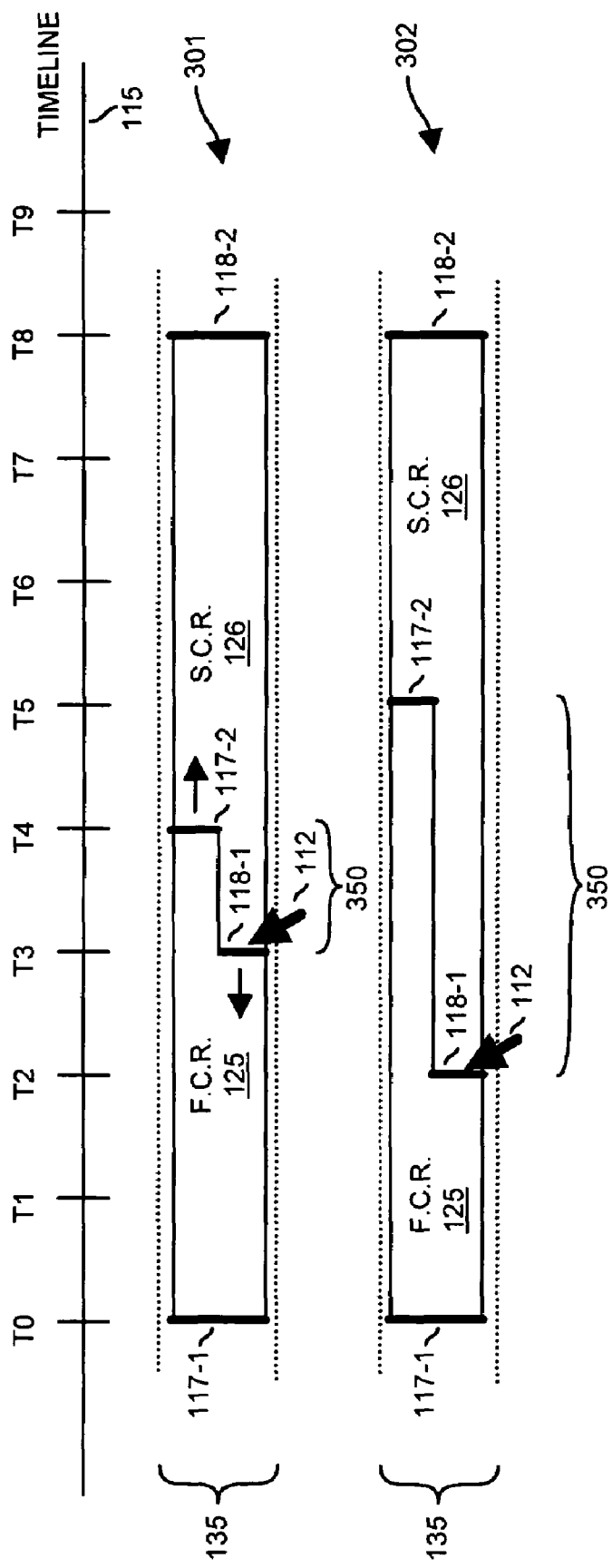
FIG. 3 is a diagram illustrating application of a transition region modification command according to an embodiment herein.

FIG. 3 is a diagram illustrating application of a transition region modification command according to an embodiment herein. As shown, a respective user can initiate a respective edit mode and initiate movement of element 118-1 so that a corresponding unselected element 117-2 moves in an equal and opposite direction during a drag and drop operation.

More specifically, screenshot 301 illustrates a transition region 350 associated with first content region 125 and second content region 126 in editing track 135. Assume in this example that a respective user initiates a "save midpoint" mode such that a respective midpoint associated with transition region 350 remains at a fixed location with respect to timeline 115 during a trim content operation. After selecting such a mode, assume further that the user select, drags, and drops element 118-1 one unit to the left with respect to timeline 115. In response to such input, editor application 105 enlarges transition region 305 by one unit on each side as shown in screenshot 302. In other words, the transition region 350 was initially one time unit wide in screenshot 301. After applying the drag and drop operation, the editor application displays transition region 350 to be 3 time units wide as shown in screenshot 302 because element 117-2 moves to the right by one unit in response to the edit operation. Note that the midpoint between element 118-1 and 117-2 remains the same before and after application of the input command.

Accordingly, embodiments support initiating automatic movement of element 118-1 with respect to the element 117-2 (or vise versa) on display medium 130 such that element 118-1 and element 117-2 appear to move an equal amount and in opposite direction with respect to each other during a selection and dragging of either one of element 118-1 or element 117-2. This automatic movement of an opposing element in the transition region 350 enables a respective user to easily modify a size of the transition region 350 between the first content region 125 and second content region while the midpoint stays in a fixed position relative to timeline 115.

Accordingly, embodiments herein support operations of receiving a command to trim a respective end of the first content region 125 and/or the second content region 126 in the transition region 350 and, in response to receiving the command, initiating trimming of respective ends of both the first content region 125 and the second content region 126 in the transition region 350 (e.g., overlapping region) such that a midpoint between the respective ends remains fixed with respect to a position on a corresponding timeline 115 associated with the editing track 135.

Figure 4:
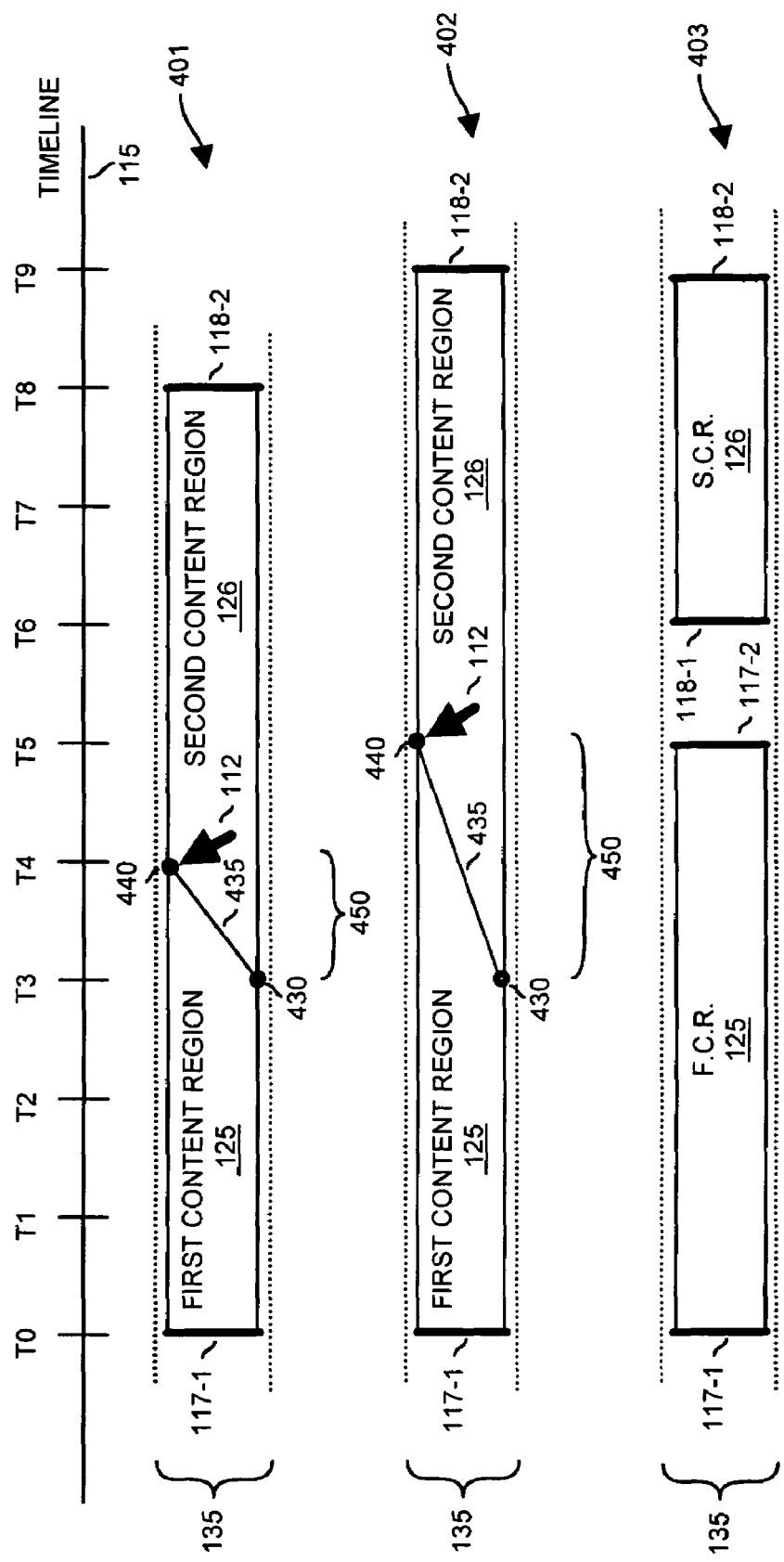
FIG. 4 is a diagram illustrating an alternative way to illustrate a transition region and apply respective modifications according to an embodiment herein.

FIG. 4 is a diagram illustrating an alternative way to illustrate a transition region 450 and apply respective modifications according to an embodiment herein. As shown, screenshot 401 indicates that first content region 125 and second content region 126 overlap each other in transition region 450. However, the present example uses element 430 (e.g., a selectable point) and element 440 (e.g., another selectable point) to illustrate respective boundaries and selectable endpoints for initiating trim operations. Each of element 440 and element 430 can be dragged and dropped along an axis parallel to timeline 115. Visual aid 435 (e.g., a diagonal line, box, etc.) indicates a presence of the transition region 450 between first content region 125 and second content region 126.

Using screenshot 401 as a starting point, assume that a respective user applies an editing command to modify a respective transition region 450 initially between time T3 and T4 of timeline 115. Assume that the user selects element 440 and element 118-2 as a pre-selected grouping in which members of the grouping move together when moved with respect to timeline 115 as discussed above. Assume further that the user selects, drags, and drops one of element 440 or element 118-2 to the right by one time unit. As a result of such input, editor application displays the first content region 125, second content region 126, and transition region 450 as shown in screenshot 402.

Using screenshot 402 as a starting point, assume that a respective user deselects the grouping as discussed above so that selected elements move individually with respect to timeline 115. Assume further that the user selects, drags, and drops element 430 to the right by three time units. As a result of such input, editor application 105 displays the first content region 125, second content region 126, and transition region 450 as shown in screenshot 403.

Accordingly, editor application 105 can receive a first command indicating selection of a set (e.g., grouping) of at least one of the respective ends (e.g., element 117 or element 118) associated with the first content region 125 and/or the second content region 126. In response to receiving a second command to modify or move one of the respective ends in the grouping, the editor application 105 applies the second command 20 to each respective end in the set such that all respective ends in the set move in the same direction and equal amount as the respective end in the set being moved with respect to the timeline 115. Respective ends associated with the first content region 125 and second content region 126 that are not part of the set or grouping remain at a fixed location relative to the timeline during the move operation. As previously discussed, the editor 25 application can provide a visual indication to distinguish respective elements included in the grouping as well as those not in the grouping such that a respective user knows which elements will move during a respective trim operation.

Figure 5:
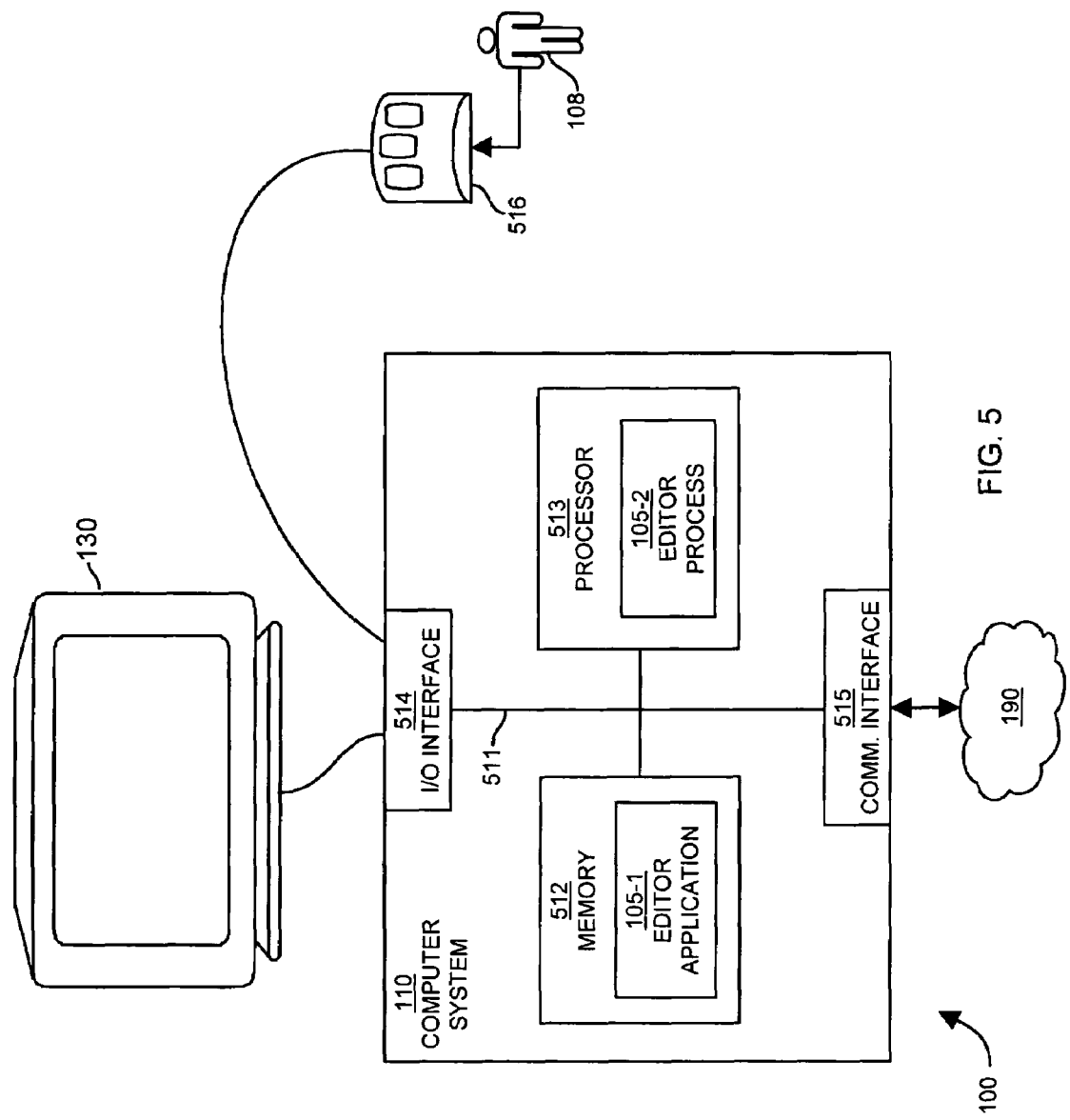
FIG. 5 is an example of a computer environment and corresponding computer system for executing an editor application according to an embodiment herein.

FIG. 5 is a block diagram of a computer environment 100 illustrating an example architecture of a respective computer system 110 for implementing editor application 105 according to embodiments herein. Computer system 110 can be a computerized device such as a personal computer, workstation, portable computing device, console, network terminal, processing device, etc.

As shown, computer system 110 of the present example includes an interconnect 511 that couples a memory system 512, a processor 513, I/O interface 514, and a communications interface 515. I/O interface 514 potentially provides connectivity to peripheral devices 516 such as a keyboard, mouse (e.g., selection tool 116), display screens (e.g., display medium 130), etc. User 108 provides input to computer system 110. Communications interface 515 enables computer system 110 to communicate over network 190 to retrieve and transmit information from remotely located sources if necessary.

As shown, memory system 512 is encoded with editor application 105-1 that supports selection and/or paste functions as discussed above and as discussed further below. Editor application 105-1 can be embodied as software code such as data and/or logic instructions (e.g., code stored in the memory or on another computer readable medium such as a disk) that supports processing functionality according to different embodiments described herein. During operation of one embodiment, processor 513 accesses memory system 512 via the use of interconnect 511 in order to launch, run, execute, interpret or otherwise perform the logic instructions of the editor application 105-1. Execution of the editor application 105-1 produces processing functionality in editor process 105-2. In other words, the editor process 105-2 represents one or more portions of the editor application 105-1 performing within or upon the processor 513 in the computer system 110.

It should be noted that, in addition to the editor process 105-2 that carries out method operations as discussed herein, other embodiments herein include the editor application 105-1 itself (i.e., the un-executed or non-performing logic instructions and/or data). The editor application 105-1 may be stored on a computer readable medium such as a floppy disk, hard disk or in an optical medium. According to other embodiments, the editor application 105-1 can also be stored in a memory type system such as in firmware, read only memory (ROM), or, as in this example, as executable code within the memory system 512 (e.g., within Random Access Memory or RAM).

In addition to these embodiments, it should also be noted that other embodiments herein include the execution of editor application 105-1 in processor 513 as the editor process 105-2. Thus, those skilled in the art will understand that the computer system 110 can include other processes and/or software and hardware components, such as an operating system that controls allocation and use of hardware resources.

Functionality supported by computer system 110 and, more particularly, functionality associated with editor application 105-1 and editor process 105-2 will now be discussed via flowcharts in FIGS. 6 through 9. For purposes of the following discussion, computer system 110 or (e.g., editor application 105-1 and/or editor process 105-2) generally performs steps in the flowcharts.

Note that there will be some overlap with respect to concepts discussed above for FIGS. 1 through 5. Also, note that the steps in the below flowcharts need not always be executed in the order shown.

Figure 6:
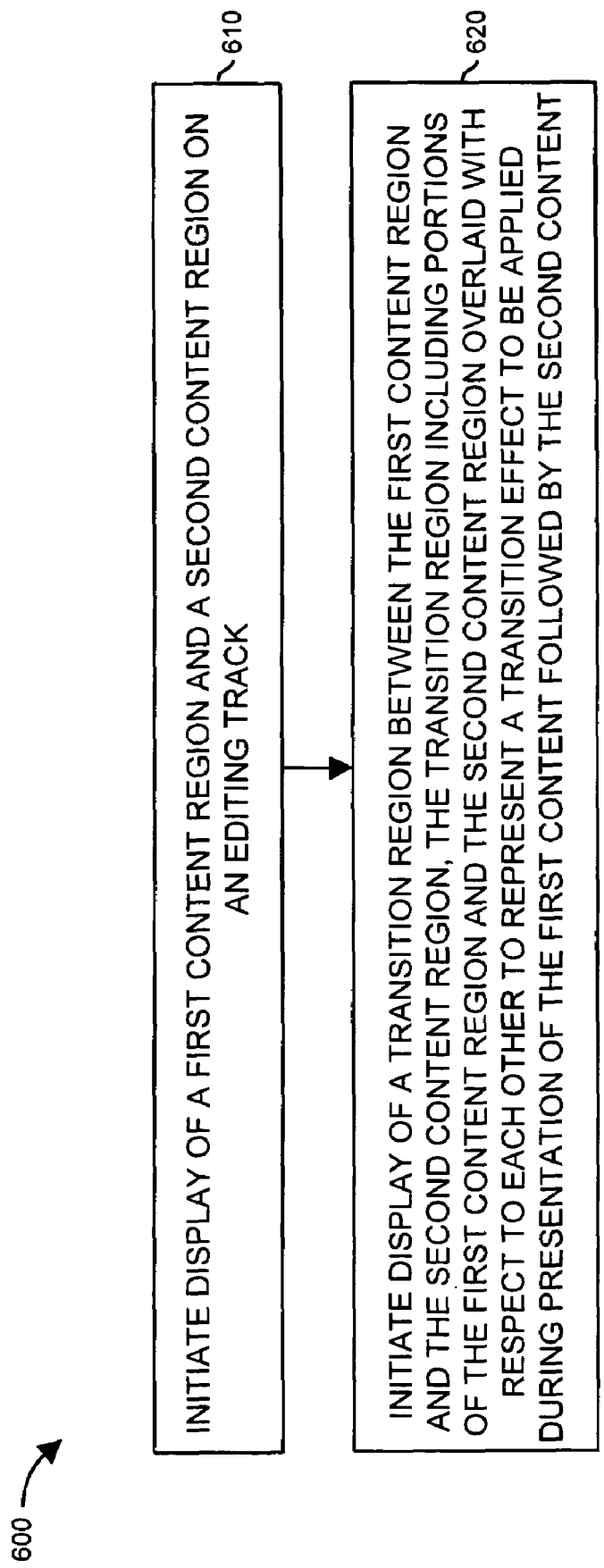
FIG. 6 is a flowchart illustrating a general technique for initiating display of a respective transition region according to an embodiment herein.

FIG. 6 is a flowchart 600 illustrating a technique of conveying presence of a transition region according to an embodiment herein. Flowchart 600 of FIG. 6 will make reference to matter previously discussed with respect to FIGS. 1-5.

In step 610, the editor application 105 initiates display of a first content region 125 and a second content region 126 on an editing track 135.

In step 620, the editor application 105 initiates display of a transition region 150 between the first content region 125 and the second content region 126. The transition region 150 includes portions of the first content region 125 and the second content region 126 overlaid with respect to each other in order to represent a transition effect to be applied during presentation of content associated with the first content region 125 followed by content associated with the second content region 126.

Figure 7:
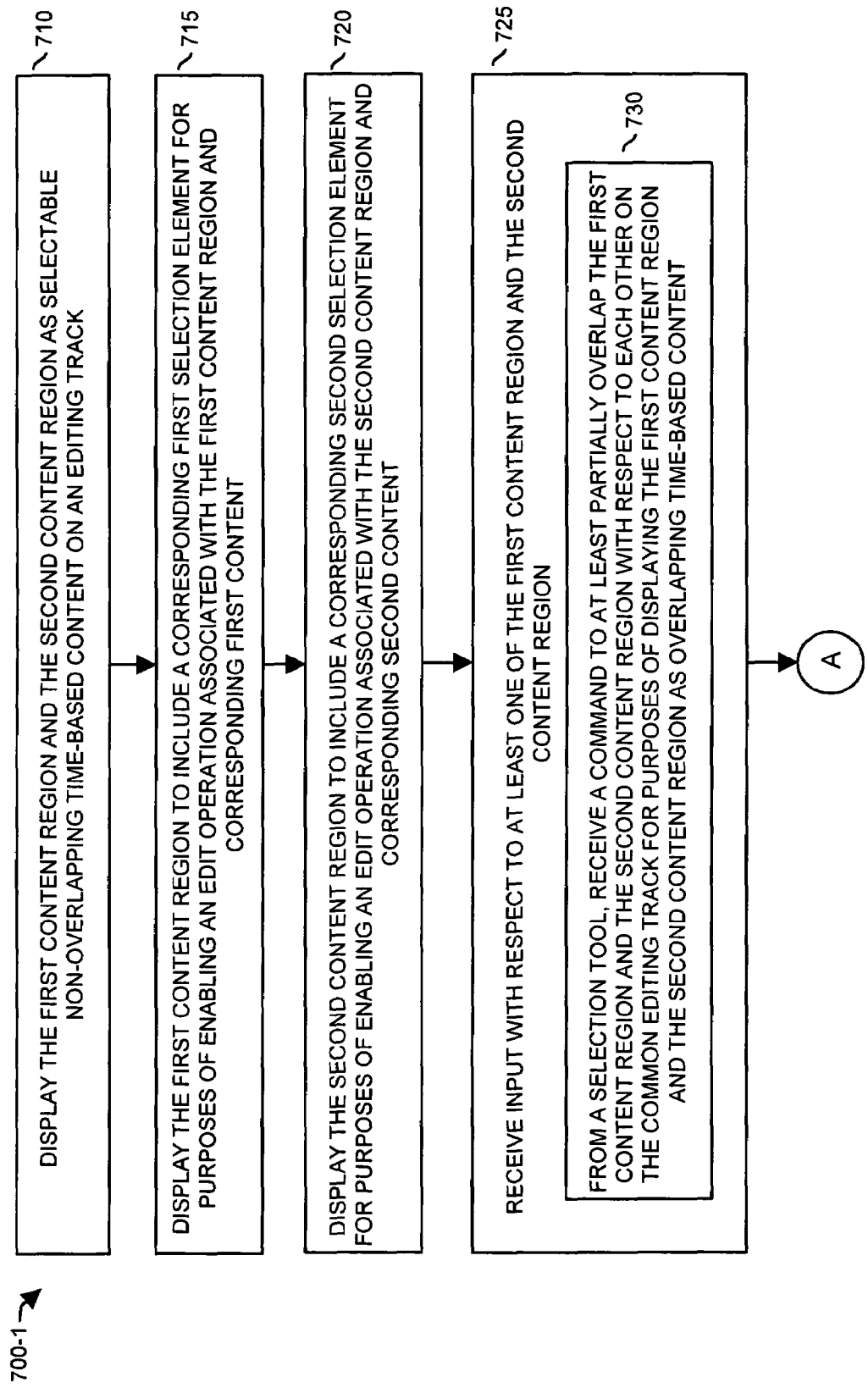
Figure 9:
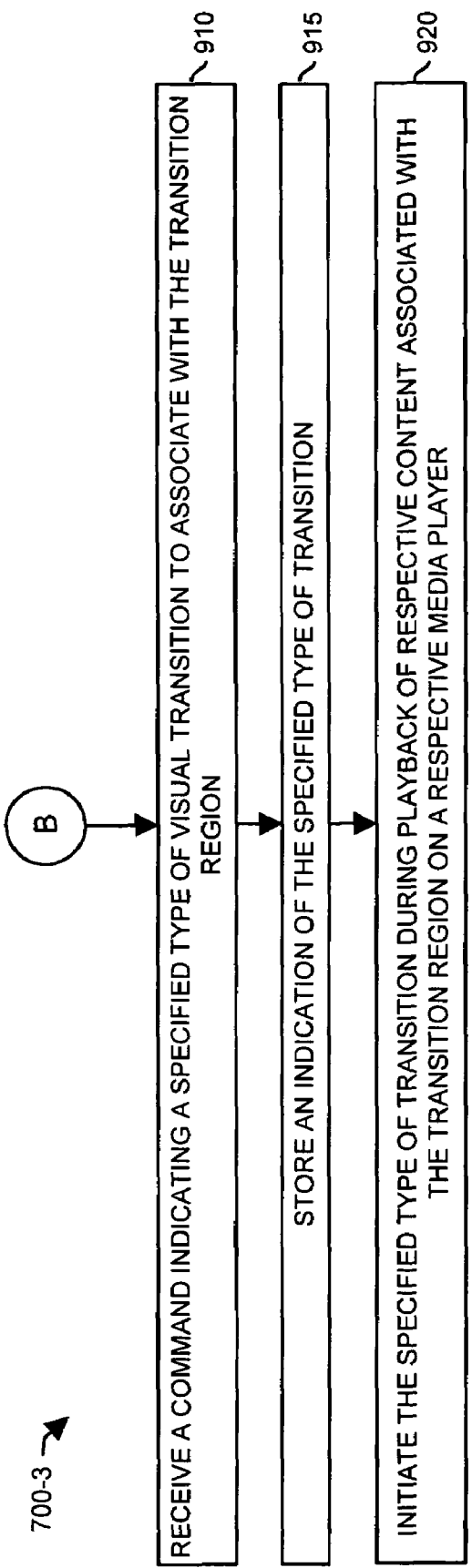

FIGS. 7 through 9 illustrate more specific techniques associated with embodiments herein. Note that according to the present example embodiment, the steps in flowcharts 700-1, 700-2, and 700-3 (collectively, flowchart 700) are carried out by a processing entity such as editor application 105. However, the entity that executes the operational steps can vary depending on the application.

In step 710, the editor application 105 displays the first content region 125 and the second content region 126 as selectable non-overlapping time-based content on an editing track 135.

In step 715, the editor application 105 displays the first content region 125 to include a corresponding selection element 117-2 for purposes of enabling an edit operation associated with the first content region 125 and corresponding first content.

In step 720, the editor application 105 displays the second content region 126 to include a corresponding second selection element 118-1 for purposes of enabling an edit operation associated with the second content region 126 and corresponding second content.

In step 725, the editor application 105 receives input with respect to at least one of the first content region 125 and the second content region 126.

In sub-step 730 associated with step 725, the editor application 105 receives a command (from tool 116) to at least partially overlap the first content region 125 and the second content region 126 with respect to each other on the common editing track 135 for purposes of displaying the first content region 125 and the second content region 126 as overlapping content when played back on a respective media player.

In step 815, in response to receiving the input, the editor application 105 initiates display of a transition region 150 between the first content region 125 and the second content region 126. The transition region 150 includes portions of the first content region 125 and the second content region 126 overlaid with respect to each other to represent a transition effect to be applied during playback.

In sub-step 820 associated with step 815, the editor application 105 i) utilizes a first region of the transition region 150 to display a portion of the first content region 125 in lieu of displaying a portion of the second content region 126, and ii) utilizes a second region of the transition region 150 to display a portion of the second content region 126 in lieu of displaying a portion of the first content region 125.

In sub-step 825 associated with step 815, the editor application 105 initiates display of a visual aid 122 to indicate a separation between the portion of the first content region 125 and the portion of the second content region 126 displayed in the transition region 150.

In sub-step 830 associated with step 815, the editor application 105 enables selective display of the visual aid 122 to indicate the separation.

In sub-step 835 associated with step 815, the editor application 105 displays element 117-2 for purposes of enabling an edit operation associated with the first content region 125 and to indicate a time-based boundary of the first content region 125.

In sub-step 840 associated with step 815, the editor application 105 displays element 118-1 for purposes of enabling an edit operation associated with the second content region 126 and to indicate a time-based boundary of the second content region 126.

In step 910, the editor application 105 receives a command indicating a specified type of visual transition to associate with the transition region 150.

In step 915, the editor application 105 stores an indication of the specified type of transition.

In step 920, the editor application 105 initiates the specified type of transition during playback of respective content associated with the transition region 150 on a respective media player.

Note again that techniques herein are well suited for use in time-based editor applications such as those that support creating, modifying, displaying, and playback of transitions associated with overlapping video content. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   initiating display of a first content region and a second content region on an editing track;
   initiating display of a transition region between the first content region and the second content region, the transition region including portions of the first content region and the second content region overlaid with respect to each other to represent a transition effect to be applied during successive presentation of content associated with the first content region and the second content region;
   wherein initiating display of the transition region includes:
   displaying a first selection element in a first region of the transition region for purposes of enabling an edit operation associated with the first content region and to indicate a boundary of the first content region;
   displaying a second selection element in a second region of the transition region for purposes of enabling an edit operation associated with the second content region and to indicate a boundary of the second content region;
   initiating automatic movement of the second selection element with respect to the first selection element on a respective display screen such that the first selection element and the second selection element appear to move an equal amount and in opposite direction with respect to each other during selection and dragging of the first selection element; and
   the automatic movement enabling a respective user to modify a size of the transition region between first content associated with the first content region and second content associated with the second content region.

2. A method as in claim 1, wherein initiating display of the transition region includes i) utilizing a first region of the transition region to display a portion of the first content region in lieu of displaying a portion of the second content region, and ii) utilizing a second region of the transition region to display a portion of the second content region in lieu of displaying a portion of the first content region.

3. A method as in claim 1, wherein initiating display of the transition region occurs in response to receiving input with respect to at least one of the first content region and the second content region; and
   wherein receiving the input includes, from a selection tool, receiving a command to at least partially overlap the first content region and the second content region with respect to each other on the editing track for purposes of displaying the first content region and the second content region as overlapping time-based content.

4. A method as in claim 2, wherein initiating display of the transition region includes:
   displaying a time-based boundary associated with the first content region in the first region of the transition region; and
   displaying a time-based boundary associated with the second content in the second region of the transition region.

5. A method as in claim 1 further comprising:
   initiating display of a timeline with respect to the editing track to enable measuring of the transition region.

6. A method as in claim 1 further comprising receiving a command indicating a specified type of visual transition to associate with the transition region;
   storing an indication of the specified type of transition; and
   initiating the specified type of transition during playback of respective content associated with the transition region on a respective media player.

7. A method as in claim 2, wherein initiating display of the transition region includes:
   displaying a first element in the first region of the transition region to indicate a time-based boundary associated with the first content region; and
   displaying a second element in the second region of the transition region to indicate a time-based boundary associated with the second content region.

8. A method as in claim 1, further comprising:
   enabling selective display of a visual aid for measuring the transition region.

9. A method as in claim 3 further comprising:
   prior to receiving the input:
   displaying the first content region and the second content region as selectable non-overlapping time-based content on a respective display screen;
   displaying the first content region to include a corresponding first selection element for purposes of enabling an edit operation associated with the first content region and corresponding first content; and displaying the second content region to include a corresponding second selection element for purposes of enabling an edit operation associated with the second content region and corresponding second content.

10. A method as in claim 9, wherein initiating display of the at least partially overlapping region includes:
after receiving the input:
displaying part but not all of the first selection element in the first display region to indicate where the first content region ends with respect to a timeline; and
displaying part but not all of the second selection element in the second display region to indicate where the second content region begins with respect to the timeline.

11. A method as in claim 1 further comprising:
displaying a first boundary marker at an opposite end of the first content region as the first selection element;
during a drag and drop operation with respect to the first selection element of the first content region, initiating movement of the first boundary marker such that the first boundary marker and the first selection element of the first content region are maintained at a fixed length with respect to each other;
displaying a second boundary marker at an opposite end of the second content region as the second selection element; and
during a drag and drop operation with respect to the second handle of the second content region, initiating movement of the second boundary marker such that the second boundary marker and the second selection element of the second content region are maintained at a fixed length with respect to each other.

12. A method as in claim 1 further comprising:
displaying a head selector in the second region of the transition region to identify a respective beginning of the second content region with respect to the timeline; and
displaying a tail selector associated with the second content region at an opposite end of the second content region as the head selector to identify a respective ending of the second content region with respect to the timeline.

13. A method as in claim 1 further comprising:
selectively displaying respective elements associated with the first content region and second content region depending on a selected mode setting of an editor application initiating display of the first content region and the second content region, the elements being used to edit the first content region and the second content region.

14. A method as in claim 1 further comprising:
generating an audible signal in response to detecting that a user attempts to enlarge one of the first content region and the second content region beyond a respective threshold value.

15. A method comprising:
initiating display of a first content region and a second content region on an editing track;
initiating display of a transition region between the first content region and the second content region, the transition region including portions of the first content region and the second content region overlaid with respect to each other to represent a transition effect to be applied during successive presentation of content associated with the first content region and the second content region;
receiving a command to trim a respective end of at least one of the first content region and second content region in the transition region; and in response to receiving the command, initiating trimming of respective ends of both the first content region and the second content region in the transition region such that a midpoint between the respective ends remains fixed with respect to a position on a corresponding timeline associated with the editing track.

16. A method comprising:
initiating display of a first content region and a second content region on an editing track;
initiating display of a transition region between the first content region and the second content region, the transition region including portions of the first content region and the second content region overlaid with respect to each other to represent a transition effect to be applied during successive presentation of content associated with the first content region and the second content region;
enabling selection and trimming of respective ends of the first content region and the second content region with respect to a corresponding timeline associated with the editing track;
and receiving a first command indicating selection of a set of at least one of the respective ends;
and in response to receiving a second command to modify one of the respective ends in the set, applying the second command to each respective end in the set such that all respective ends in the set move in the same direction and equal amount as the respective end in the set being moved about a respective display screen while other respective ends not part of the set remain at a fixed location relative to the timeline.

17. A method as in claim 16 further comprising:
providing a visual indication to distinguish respective ends that are included in the set with respective ends not included in the set.

18. A method as in claim 1, wherein initiating display of the transition region includes splicing respective ends of the first content region and the second content region in the transition region such that a portion of an end of the first content region in the transition region appears to be cut out for purposes of displaying a portion of the second content region and an end of the second content region in the transition region appears to be cut out for purposes of displaying a portion of the first content region.

19. A computer program product including a computer-readable medium having instructions stored thereon for processing data information, such that the instructions, when carried out by a processing device, enable the processing device to perform the operations of:
initiating display of a first content region and a second content region on an editing track;
initiating display of a transition region between the first content region and the second content region, the transition region including portions of the first content region and the second content region overlaid with respect to each other to represent a transition effect to be applied during successive presentation of content associated with the first content region and the second content region and initiating display of the transition region includes displaying a first region of the transition region to appear as though the first content region is partially overlaid on the second content region and displaying a second region of the transition region to appear as though the second content region is partially overlaid on the first content region;

displaying a tail selector in the first region of the transition region to identify a respective ending of the first content region with respect to a timeline associated with the editing track;

displaying a head selector associated with the first content region at an opposite end of the first content region as the tail selector to identify a respective beginning of the first content region with respect to the timeline; and wherein initiating display of the transition region includes:

displaying a first selection element in a first region of the transition region for purposes of enabling an edit operation associated with the first content region and to indicate a boundary of the first content region;

displaying a second selection element in a second region of the transition region for purposes of enabling an edit operation associated with the second content region and to indicate a boundary of the second content region;

initiating automatic movement of the second selection element with respect to the first selection element on a respective display screen such that the first selection element and the second selection element appear to move an equal amount and in opposite direction with respect to each other during selection and dragging of the first selection element; and the automatic movement enabling a respective user to modify a size of the transition region between first content associated with the first content region and second content associated with the second content region.

20. A computer program product as in claim 19, wherein initiating display of the transition region includes i) utilizing a first region of the transition region to display a portion of the first content region in lieu of displaying a portion of the second content region, and ii) utilizing a second region of the transition region to display a portion of the second content region in lieu of displaying a portion of the first content region; and wherein initiating display of the transition region includes:

displaying a time-based boundary associated with the first content region in the first region of the transition region; and displaying a time-based boundary associated with the second content in the second region of the transition region.

21. A computer program product as in claim 20 further supporting operations of:

initiating display of a visual aid in a substantially horizontal manner to indicate a separation between a portion of the first content region and a portion of the second content region displayed in the transition region.

22. A computer program product as in claim 21, wherein initiating display of the transition region includes:

displaying a first element in the first region of the transition region to indicate a time-based boundary associated with the first content region; and displaying a second element in the second region of the transition region to indicate a time-based boundary associated with the second content region.

23. A computer program product as in claim 19, wherein initiating display of the transition region occurs in response to receiving input with respect to at least one of the first content region and the second content region, the computer program product further supporting operations of:

prior to receiving the input:

displaying the first content region and the second content region as selectable non-overlapping time-based content on a respective display screen;

displaying the first content region to include a corresponding first selection element for purposes of enabling an edit operation associated with a tail end of the first content region; and displaying the second content region to include a corresponding second selection element for purposes of enabling an edit operation associated with a head end of the second content region.

24. A computer program product as in claim 23, wherein initiating display of the transition region includes:

after receiving the input:

displaying part but not all of the first selection element at the tail end of the first content region to continue to indicate where the first content region ends with respect to a timeline; and displaying part but not all of the second selection element at the head end of the second content region to continue to indicate where the second content region begins with respect to the timeline.

25. A computer program product as in claim 19, wherein initiating display of the transition region includes:

displaying a first region of the transition region to appear as though the first content region is partially overlaid on the second content region; and displaying a second region of the transition region to appear as though the second content region is partially overlaid on the first content region.

26. A computer program product as in claim 25 further supporting operations of:

displaying a tail selector in the first region of the transition region to identify a respective ending of the first content region with respect to a timeline associated with the editing track;

displaying a head selector associated with the first content region at an opposite end of the first content region as the tail selector to identify a respective beginning of the first content region with respect to the timeline;

displaying a head selector in the second region of the transition region to identify a respective beginning of the second content region with respect to the timeline; and displaying a tail selector associated with the second content region at an opposite end of the second content region as the head selector to identify a respective ending of the second content region with respect to the timeline.

27. A computer program product including a computer-readable medium having instructions stored thereon for processing data information, such that the instructions, when carried out by a processing device, enable the processing device to perform the operations of:

initiating display of a first content region and a second content region on an editing track;

initiating display of a transition region between the first content region and the second content region, the transition region including portions of the first content region and the second content region overlaid with respect to each other to represent a transition effect to be applied during successive presentation of content associated with the first content region and the second content region;

receiving a command to trim a respective end of at least one of the first content region and second content region in the transition region; and in response to receiving the command, initiating trimming of respective ends of both the first content region and the second content region in the overlapping region such that a midpoint between the respective ends remains fixed with respect to a position on a corresponding timeline associated with the editing track.

28. A computer system that supports selection and paste operations, the computer system comprising:
 a processor;
 a memory unit that stores instructions associated with an application executed by the processor; and
 an interconnect coupling the processor and the memory unit, enabling the computer system to execute the application and perform operations of:
  initiating display of a first content region and a second content region on an editing track;
  initiating display of a transition region between the first content region and the second content region, the transition region including portions of the first content region and the second content region overlaid with respect to each other to represent a transition effect to be applied during successive presentation of content associated with the first content region followed by the second content region and initiating display of the transition region includes displaying a first region of the transition region to appear as though the first content region is partially overlaid on the second content region and displaying a second region of the transition region to appear as though the second content region is partially overlaid on the first content region;
  displaying a tail selector in the first region of the transition region to identify a respective ending of the first content region with respect to a timeline associated with the editing track;
  displaying a head selector associated with the first content region at an opposite end of the first content region as the tail selector to identify a respective beginning of the first content region with respect to the timeline; and
  receiving a command to trim a respective end of at least one of the first content region and second content region in the transition region; and
  in response to receiving the command, initiating trimming of respective ends of both the first content region and the second content region in the overlapping region such that a midpoint between the respective ends remains fixed with respect to a position on a corresponding timeline associated with the editing track.

29. A method as in claim 16 wherein a portion of master content, as represented by the first and second content region, presented during playback, is increased.

30. A method as in claim 1, wherein initiating display of the transition region includes:
 displaying a first region of the transition region to appear as though the first content region is partially overlaid on the second content region; and
 displaying a second region of the transition region to appear as though the second content region is partially overlaid on the first content region.

31. A computer system that supports selection and paste operations, the computer system comprising:
 a processor;
 a memory unit that stores instructions associated with an application executed by the processor; and
 an interconnect coupling the processor and the memory unit, enabling the computer system to execute the application and perform operations of:
 initiating display of a first content region and a second content region on an editing track;
 initiating display of a transition region between the first content region and the second content region, the transition region including portions of the first content region and the second content region overlaid with respect to each other to represent a transition effect to be applied during successive presentation of content associated with the first content region and the second content region;
 wherein initiating display of the transition region includes:
 displaying a first selection element in a first region of the transition region for purposes of enabling an edit operation associated with the first content region and to indicate a boundary of the first content region;
 displaying a second selection element in a second region of the transition region for purposes of enabling an edit operation associated with the second content region and to indicate a boundary of the second content region;
 initiating automatic movement of the second selection element with respect to the first selection element on a respective display screen such that the first selection element and the second selection element appear to move an equal amount and in opposite direction with respect to each other during selection and dragging of the first selection element; and
 the automatic movement enabling a respective user to modify a size of the transition region between first content associated with the first content region and second content associated with the second content region.

* * * * *